(12) United States Patent
Bokeloh (10) Patent No.: US 10,071,770 B2
(45) Date of Patent: Sep. 11, 2018

(54) LONGITUDINAL SUPPORT DEVICE FOR SUPPORTING A FRONT ENGINE IN A MOTOR VEHICLE

(71) Applicant: Bayerische Motoren Werke Aktiengesellschaft, Munich (DE)

(72) Inventor: Jan Bokeloh, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 44 days.

(21) Appl. No.: 15/417,738

(22) Filed: Jan. 27, 2017

(65) Prior Publication Data

US 2017/0137064 A1 May 18, 2017

Related U.S. Application Data

(63) Continuation of application No. PCT/EP2015/067460, filed on Jul. 30, 2015.

(30) Foreign Application Priority Data

Jul. 30, 2014 (DE) .................. 10 2014 214 913

(51) Int. Cl.
*B62D 25/08* (2006.01)
*B62D 21/15* (2006.01)
(Continued)

(52) U.S. Cl.
CPC ............ *B62D 21/152* (2013.01); *B60R 19/24* (2013.01); *B62D 21/11* (2013.01); *B62D 25/082* (2013.01)

(58) Field of Classification Search
CPC .... B62D 21/152; B62D 21/155; B62D 25/08; B62D 25/085; B60R 19/34
See application file for complete search history.

(56) References Cited

U.S. PATENT DOCUMENTS

| 6,328,377 B1 | 12/2001 | Makita et al. |
| 2006/0232104 A1 | 10/2006 | Yasuhara |

(Continued)

FOREIGN PATENT DOCUMENTS

| DE | 103 29 461 A1 | 2/2005 |
| DE | 10 2006 013 226 A1 | 10/2006 |

(Continued)

OTHER PUBLICATIONS

International Search Report (PCT/ISA/210) issued in PCT Application No. PCT/EP2015/067460 dated Oct. 9, 2015 with English-language translation (six (6) pages).

(Continued)

*Primary Examiner* — Bryan A Evans
(74) *Attorney, Agent, or Firm* — Crowell & Moring LLP (57) ABSTRACT

An engine support device, which is provided for supporting an engine arranged in a front-end vehicle structure of a motor vehicle, includes a first half-shell with a first end section, a second end section opposite same and a first lateral cheek section, and a second half-shell with a third end section, a fourth end section opposite same, a middle section arranged between the third and the fourth end section and a second lateral cheek section. The first half-shell as an outer shell and the second half-shell as an inner shell can be provided in a state of the engine support device installed into a motor vehicle. The first lateral cheek section has substantially straight edges in a continuous manner from the first end section thereof to the second end section thereof. The second lateral cheek section has substantially straight edges in a continuous manner from the third end section thereof to the middle section thereof and has a first offset in the direction of the first lateral cheek section between the middle section and the fourth end section and converges on the first lateral cheek section in a first longitudinal section containing (Continued)

the offset by a difference in distance which corresponds to the first offset. The second lateral cheek section is arranged on the first lateral cheek section at least in the fourth and the second end sections, respectively.

17 Claims, 7 Drawing Sheets

(51) Int. Cl.
   *B62D 21/11* (2006.01)
   *B60R 19/24* (2006.01)

(56) References Cited

U.S. PATENT DOCUMENTS

| | | | |
|---|---|---|---|
| 2009/0096253 A1* | 4/2009 | Yatsuda | B62D 21/11 296/193.09 |
| 2010/0117403 A1 | 5/2010 | Kihara et al. | |
| 2013/0241233 A1 | 9/2013 | Ohnaka et al. | |
| 2013/0320710 A1 | 12/2013 | Watanabe | |
| 2016/0152273 A1* | 6/2016 | Kuriyama | B62D 21/152 296/187.09 |
| 2017/0113638 A1* | 4/2017 | Ahuja | B60R 19/34 |
| 2017/0113735 A1* | 4/2017 | Kawabe | B62D 25/08 |
| 2017/0151919 A1* | 6/2017 | Kashiwagi | B60R 19/34 |

FOREIGN PATENT DOCUMENTS

| | | |
|---|---|---|
| DE | 10 2010 051 785 A1 | 7/2011 |
| EP | 2 314 500 A2 | 4/2011 |
| JP | 2001-71946 A | 3/2001 |
| JP | 2010-70133 A | 4/2010 |
| JP | 2013-248898 A | 12/2013 |
| WO | WO 2010/097690 A1 | 9/2010 |

OTHER PUBLICATIONS

German-language Written Opinion (PCT/ISA/237) issued in PCT Application No. PCT/EP2015/067460 dated Oct. 9, 2015 (five (5) pages).

German Search Report issued in counterpart German Application No. 10 2014 214 913.4 dated Mar. 17, 2015 with partial English-language translation (thirteen (13) pages).

\* cited by examiner

LONGITUDINAL SUPPORT DEVICE FOR SUPPORTING A FRONT ENGINE IN A MOTOR VEHICLE

CROSS REFERENCE TO RELATED APPLICATIONS

This application is a continuation of PCT International Application No. PCT/EP2015/067460, filed Jul. 30, 2015, which claims priority under 35 U.S.C. § 119 from German Patent Application No. 10 2014 214 913.4, filed Jul. 30, 2014, the entire disclosures of which are herein expressly incorporated by reference.

BACKGROUND AND SUMMARY OF THE INVENTION

The present invention relates to a longitudinal or engine support device for supporting an engine, particularly a front engine, which device is arranged in a front end vehicle structure of a motor vehicle.

In known vehicle body concepts in the field of motor vehicle construction, longitudinal supports or engine supports in a sheet metal shell or profile construction are known, which are made of steel and/or aluminum. The known longitudinal or engine supports have an essentially constant, for example, rectangular cross-sectional profile along their course from a rearward to a forward end. Local stampings and through-holes for the connection with auxiliary and reinforcing parts and/or for the connection with a longitudinal support of a bumper arrangement may be provided in the profile.

Figure 1:
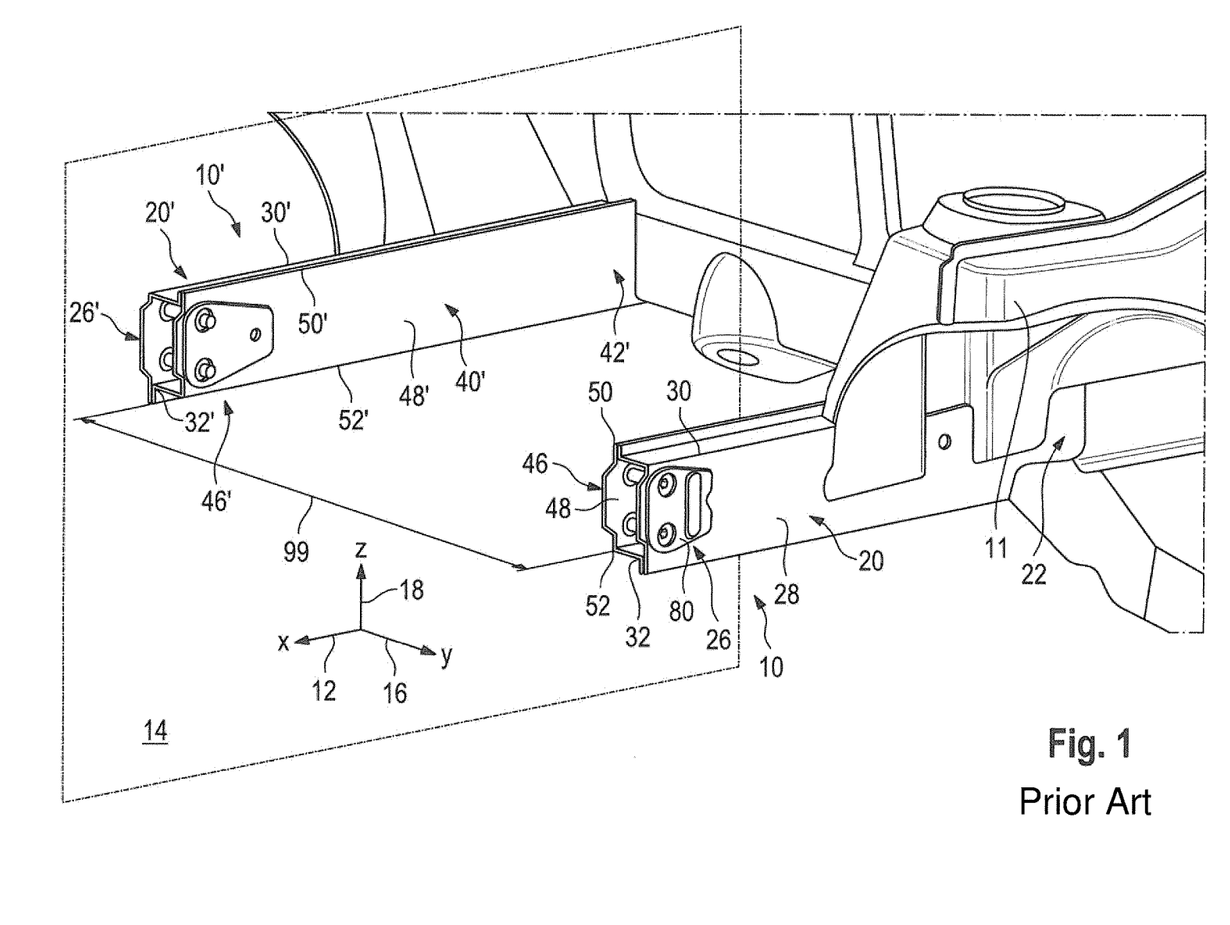
FIG. 1 is a perspective view of a vehicle front end structure with supporting parts of a motor vehicle with a conventional engine support.

FIG. 1 illustrates a front face section (vehicle front end structure) of a vehicle body superstructure of a motor vehicle, in which a conventional left and right engine support 10, 10' are arranged between a left and a right frontal wheel cover mass 11. These engine supports 10, 10' are essentially oriented parallel to one another as well as mirror-symmetrically with respect to a plane of symmetry 14 of the body of the motor vehicle and in a longitudinal direction (x-direction) 12 of the vehicle. As also outlined in FIG. 2, each engine support 10 is composed of a first half-shell 20 arranged on the outside and a second half-shell 40 arranged on the inside. The first half-shell 20 has a first side cheek section 28, 28' with an upper edge 30, 30' and a lower edge 32, 32' and extends from a first end section 22, 22' arranged in the rear to a forward second end section 26, 26'. The second half-shell 40 has a second side cheek section 48, 48' with an upper edge 50 and a lower edge 52 and extends from a third end section 42 arranged in the rear to a forward fourth end section 46.

The engine supports 10, 10' illustrated in FIG. 1 have an essentially constant rectangular cross-sectional profile along their entire course. Correspondingly, the upper and lower edge 30 and 32 of the first side cheek section 28 of the first half-shell 20, 20' as well as the upper and lower edge 50 and 52 of the second side cheek section 48 of the second half-shell 40, 40' extend essentially in a straight line and are oriented in the longitudinal direction 12 of the vehicle. Between the second side cheek sections 48 and 48' of the second half shells 40 and 40' of the left and right engine support 10 and 10', arranged on the inside, a vacant space is formed, that has a total width 99 measured in a transverse direction (y-direction) 16 of the vehicle. In this free space, between the forward end sections 26 and 46, respectively, of the engine supports 10, 10', among others, a radiator package (not shown) is installed, whose width is severely restricted by the total width 99 predefined by the engine support path.

The engine support path is predefined by the left and right wheel cover mass 11, more precisely, the distance between interior surfaces (not designated) of the left and right wheel cover mass 11, whereby a restricted installation space, particularly of a total width 99, is available between the engine supports 10 and 10'.

Furthermore, in the event of crash loads at a barrier 91 with a relatively small overlap 98 with a longitudinal support 94 of a bumper arrangement 90 of a motor vehicle (see FIG. 2), no or only relatively little energy can be dissipated by a deformation of the engine support 10.

An orientation of the engine support 10 that is not parallel to the main direction, i.e. the longitudinal direction, results is problematic crash behavior at low speeds, because a force applied to the engine support profile cannot be sufficiently supported, with the result that the engine support 10 and 10' will buckle or dent. The same will apply if, although the engine supports 10 and 10' would be oriented between the wheel cover masses 11 in the longitudinal direction of the vehicle, their path (distance) in the area in front of the wheel cover masses 11 would have a spread shape.

It is an object of the invention to provide a longitudinal or engine support device for supporting an engine in a motor vehicle, in which case the total width of the installation space between a left and a right engine support, particularly between the forward end section of the engine supports, is enlarged without impairing the effectiveness in the event of crash loads at low and high speeds.

This and other objects are achieved by a longitudinal or engine support device for supporting an engine, as well as a front end vehicle structure of a motor vehicle, in accordance with embodiments of the invention.

According to a first aspect of the invention, a longitudinal support or engine support device is provided for supporting an engine arranged in the forward area of a motor vehicle. The engine support device comprises a first half-shell (particularly an exterior shell) having a first end section, a second end section opposite the first end section, and a first side cheek section, and a second half-shell (particularly an interior shell) having a third end section, a fourth end section opposite the third end section, a middle section arranged between the third and the fourth end section and a second side cheek section. The first side cheek section continuously has straight edges from its first end section to its second end section. Particularly in a condition installed in a motor vehicle, the first half-shell is provided as an exterior shell and the second half-shell is provided as an interior shell.

It is an aspect of the invention that the second side cheek section, from its third end section to its middle section continuously has essentially straight edges, and between the middle section and the fourth end section, has a first offset in the direction of the first side cheek section.

Accordingly, in a longitudinal section containing the first offset, the second side cheek section approaches the first side cheek section by a difference in distance, which corresponds to the first offset. Furthermore and accordingly, the second side cheek section rests essentially against the first side cheek section at least in the fourth and the second end sections, respectively.

In the fourth and second end sections respectively, the second side cheek section can, particularly essentially, rest flatly against the first side cheek section.

The second side cheek section can rest against the first side cheek section, particularly in an essentially flat manner, not only in the fourth and second end section respectively but in an entire longitudinal section which extends between the longitudinal section containing the first offset and the fourth (and second) longitudinal section.

In a condition, in which the engine support device is installed in a motor vehicle, the second end section of the first half-shell is provided as the forward section in a longitudinal direction of the vehicle, and the fourth end section of the second half-shell is provided as the forward section in the longitudinal direction of the vehicle. Correspondingly, in the installed condition in a motor vehicle, the first end section of the first half-shell is provided as the rearward section in a longitudinal direction of the vehicle, and the third end section of the second half-shell is provided as the rearward section in the longitudinal direction of the vehicle.

In other words, it is provided according to the invention that, between the middle section and the fourth (forward) end section, the second side cheek section of the second half-shell (interior shell) has a first offset in the direction of the first side cheek section of the first half-shell (exterior shell), that, in the longitudinal section containing the first offset, the second side cheek section converges by a difference in distance corresponding to this first offset (measured in a transverse direction of the vehicle), and that the second side cheek section rests against the first side cheek section at least in the fourth and second end sections (i.e. in the forward end section).

The second side cheek section preferably rests against the first side cheek section (particularly in a flat manner) over the entire longitudinal section, in which it is offset by the first offset in the direction of the first side cheek section.

As a result of the fact that the second side cheek section of the engine support device arranged in the interior when it is installed in a vehicle, in proximity of its forward fourth end section, has a first offset in the direction of the first side cheek section, the space width between the second side cheek sections arranged on the inside is in each case increased by this first offset, on each of the two engine support devices i.e. on the left and on the right engine support device. On the whole, a widening of the space width in the area of the fourth (forward) end sections of the left and right engine support device by twice that of the first offset is thereby achieved.

The first half-shell (exterior shell) and the second half-shell (interior shell) may be designed for essentially extending in a longitudinal direction of a motor vehicle. The first half-shell may be designed for being on an exterior side of the device, and the second half-shell may be designed for being arranged on an interior side of the device. In a condition in which the engine support device is installed in a motor vehicle, it is provided that the second end section is arranged in front of the first end section, and the fourth end section is arranged in front of the third end section.

Figure 2:
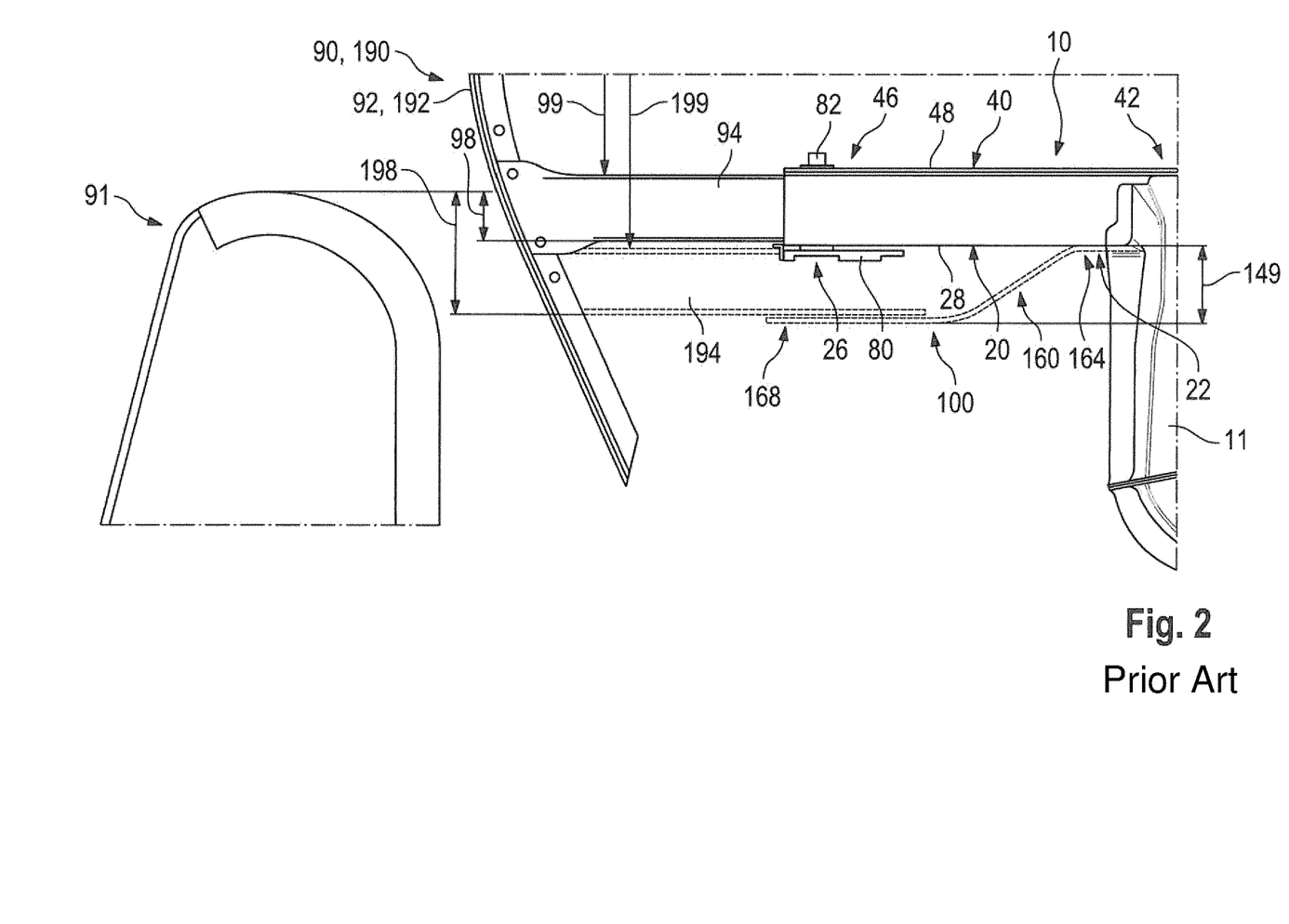
FIG. 2 is a view of a section of a conventional engine support with a bumper system mounted thereon.

As a result of the fact that, in the right engine support device, the first and the second half-shell respectively each extend essentially in the longitudinal direction of the motor vehicle, i.e. the edges or margins of the engine support device are retained which, in the state of the art according to FIGS. 1 and 2 are oriented essentially continuously in a straight line and along the longitudinal axis of the vehicle, the initially mentioned problems during the crash behavior are avoided, which occur when the engine supports are not oriented parallel to the longitudinal direction of the vehicle, or when the engine support path is shaped in a spread manner in the area of the wheel cover masses. Instead, with respect to the crash behavior, the same effectiveness is achieved which is advantageous for edges of the engine support device oriented in a straight line and along a longitudinal axis of the vehicle.

Between the middle section and the fourth end section of the second half-shell, in a first longitudinal section, which contains the first offset, the edges of the second side cheek section can approach the edges of the first side cheek section, which extend essentially in a straight line, by the first offset or by a difference in distance, which corresponds to the first offset. Furthermore, in a second longitudinal section of the second half-shell, which extends between the first longitudinal section and an end (installed in the front end in the motor vehicle) of the second side cheek section closing off the fourth end section, the edges of the second side cheek section touch the edges of the first side cheek section which extend essentially in a straight line. As a result of these further developments, the enlargement of the space width in the area of the fourth end section (arranged in the front in the vehicle) of the left and right engine support device is achieved by twice that of the first offset.

The engine support device can further comprise a mounted shell arrangement. The mounted shell arrangement may have a shell cheek section having a first and a second edge as well as a first and a second shell plate section. In this case, the first shell plate section may extend from the first edge and the second shell plate section may extend from the second edge in each case essentially perpendicular to the shell cheek section. The shell cheek section can further form a second offset, which is oriented in a direction perpendicular to the shell cheek section. In a further development, in a condition in which the mounted shell arrangement is installed in a motor vehicle, the shell cheek section may be arranged essentially perpendicularly and the first edge can be arranged above the second edge, and the second offset can be oriented in a transverse direction of the vehicle in the direction of the exterior side of the motor vehicle. Advantageously, the second offset of the shell cheek section of the mounted shell arrangement may essentially have the same size as the first offset of the second side cheek section of the second half-shell.

In an embodiment of the engine support device, the first half-shell may have a horizontal section, which, in a condition in which the device is installed in a motor vehicle, is on top, and which arranged on a top side and essentially horizontally, has a first top side edge flange extending from an interior edge of the upper horizontal section essentially vertically upwards. The second half-shell may have a second top side edge flange, which, in the installed condition of the device, is arranged on a top side and extends essentially vertically upwards. The second top side edge flange can rest against the first top side edge flange, and, in particular, can be connected with the latter.

Furthermore, in the above-mentioned embodiment, the first half-shell may have a first bottom side edge flange which, in a condition in which the device is installed in a motor vehicle, is arranged on a bottom side and extends essentially vertically downward. The second half shell may have a horizontal section, which is at the bottom in the installed condition of the device and which is arranged on a bottom side and essentially horizontally, and a second bottom side edge flange extending from an outer edge of the lower horizontal section essentially vertically downward. The second bottom side edge flange may rest against the first bottom side edge flange, and in particular, may be connected with the latter.

In an alternative embodiment of the engine support device, the second half-shell may have a horizontal section, which is on top in a condition of the device installed in a motor vehicle, which horizontal section is arranged on a top side and essentially horizontally, and may have a second top side edge flange which extends from an exterior edge of the upper horizontal section essentially vertically upward. The first half-shell may have a first top side edge flange, which in the installed condition of the device, is arranged on a top side and extends essentially vertically upward, and the second top side edge flange can rest against the first top side edge flange and can particularly be connected with the latter.

In the above-mentioned alternative embodiment, the second half-shell may further have a second bottom side edge flange which, in a condition in which the device is installed in a motor vehicle, is arranged on a bottom side and extends essentially vertically downward. The first half-shell, in the installed condition of the device, may have a lower horizontal section, which is arranged on the bottom side and essentially horizontally, and a first bottom side edge flange extending from an interior edge of the bottom horizontal section vertically downward. The second bottom side edge flange may rest against the first bottom side edge flange, and, in particular, may be connected with the latter.

The mounted-shell arrangement may have a third top side edge flange which, in a condition in which the mounted-shell arrangement is installed in a motor vehicle, extends from an edge of the first shell plate section facing the shell cheek section, essentially vertically upward, and further a third bottom side edge flange, which, in the condition in which the mounted-shell arrangement is installed, extends from an edge of the second shell plate section facing away from the shell cheek section, essentially vertically downward. In this case, the third top side edge flange may rest against the first top side edge flange, and, in particular, may be connected with the latter. Furthermore, the third bottom side edge flange may rest against the first bottom side edge flange, and, in particular, may be connected with the latter.

The engine support device may further comprise an essentially plate-shaped reinforcing element, which is provided for reinforcing the connection with a longitudinal support of a bumper system and which, in a condition in which the device is installed in a motor vehicle, can be fastened to an exterior side of the second end section of the first half-shell. This reinforcing element is used for reinforcing the connection of the engine support device with a longitudinal support of a bumper system.

According to a second aspect of the invention, a vehicle front end structure or front part of a motor vehicle is provided, which is constructed, for example, for receiving an engine, particularly an internal-combustion engine, and includes a first engine support device according to the first aspect of the invention, and with a first mounted-shell arrangement which is assigned to the first engine support device and which is arranged in the vehicle on the left of a plane of symmetry of the vehicle and extends in a longitudinal direction of the vehicle, and further a second engine support device according to the first aspect of the invention, and with a second mounted-shell arrangement which is assigned to the second engine support device and which is arranged in the vehicle on the right of the plane of symmetry of the vehicle and extends in the longitudinal direction. As a result of the fact that two engine support devices according to a first aspect of the invention are provided in the front part, a widening of the space width by more than twice the first offset is achieved between the forward (fourth) end sections of the interior second half-shell.

The vehicle front end structure of the motor vehicle may further comprise a bumper arrangement, having a front bumper element, which extends in a transverse direction of the vehicle, a first longitudinal support, which extends from the front bumper element in a longitudinal direction of the vehicle toward the rear, and is arranged on the left of the plane of symmetry of the vehicle, and a second longitudinal support, which extends from the bumper element in the longitudinal direction of the vehicle toward the rear and is arranged on the right of the plane of symmetry of the vehicle. In this case, the first longitudinal support may be connected by way of the first mounted-shell arrangement assigned to it with the first engine support device, and the second longitudinal support may be connected by way of the second mounted-shell arrangement assigned to it with the second engine support device.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 and 2 show details of a vehicle front end structure (front part) of a vehicle body of a motor vehicle having a left and a right engine support 10 and 10' according to the state of the art. In the case of the engine supports 10 and 10', in each case, the upper and the lower edge 30 and 32 of the first half-shell 20 and the upper and the lower edge 50 and 52 of the second half-shell 40 is constructed from its first and third (rearward) end sections 22 and 42 to its second and fourth (forward) end sections 26 and 46 essentially in a straight line, and, in the installed condition, the engine support 10 and 10' is oriented in the direction of the longitudinal direction of the vehicle (x-direction) 12. A space having a width 99 is available between the second and fourth (forward) end sections 26 and 46 of the left and the right engine supports 10 and 10'. The space width 99 is determined by the path of the engine supports 10 and 10', and this path is restricted by the distance of the wheel cover mass 11 measured in the transverse direction (y-direction 16).

One longitudinal support 94 respectively of a bumper arrangement 90 (FIG. 2 shows only the left engine support 10 and the left longitudinal support 94) is mounted at the second and fourth (forward) end sections 26 and 46 of the left and right engine supports 10 and 10'. The bumper arrangement 90 comprises the left longitudinal support 94, a right longitudinal support (not shown) and a front bumper element 92 mounted on the forward ends of the left and right longitudinal support. In a crash test geometry, as illustrated in FIG. 2, in which the motor vehicle drives against a barrier 91 arranged on the outside (FIG. 2, left outside) with respect to a longitudinal direction 12 of the vehicle, an overlap 98 exists between the vehicle, more precisely, the left longitudinal support 94, and the barrier 91.

FIG. 2 further indicates the outlines shown by broken lines (phantom presentation) of an engine support device 100 according to the invention, in which a forward (sixth) end section 168 of a mounted-shell arrangement 160 is arranged by an offset 149 with respect to a rearward fifth end section 164 of the mounted-shell arrangement 160 and correspondingly the fourth (forward) end section (compare 146 in FIGS. 3A and 3B) of the second (interior) side cheek section of the second (interior) half-shell (compare 140 in FIGS. 3A and 3B) is offset to the outside. Correspondingly, the space width at the left engine support device 100 will increase with respect to space width 99 available with the conventional engine support 10 to the space width 199 enlarged by the offset 149, and likewise at the right engine support device (not shown). According to the invention, the space width 199, on the whole, is therefore enlarged by twice that of the first offset 149. With the offset 149, the overlapping 98 between the outermost (in FIG. 2, the uppermost) point of the barrier 91 and the vehicle (more precisely, the longitudinal support 94 and 194 respectively) is also enlarged from the overlapping 98 existing in the case of the conventional engine support 10 to the overlapping 198 enlarged by the offset 149.

As a result of the overlapping 198 enlarged according to the invention between the barrier 91 and the longitudinal support 194, the longitudinal support 194 cannot yield as in the case of a smaller overlapping 98 and is therefore forced to absorb energy by deformation. Simultaneously, in the case of crashes at low speeds, in which the vehicle body structure is to remain free of damage, the force affecting the engine support device 100 is supported by the edges or margins 130 and 132 of the first half-shell 120, which extend in a straight line, in the direction of the front wall.

Figure 3A:
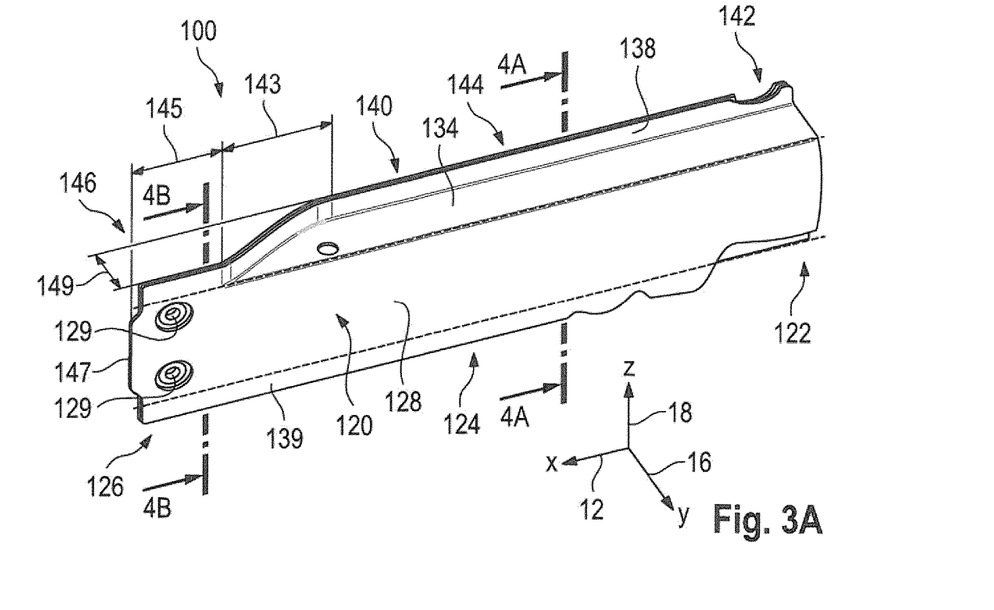
FIG. 3A is a perspective view of an engine support device according to an embodiment.
Figure 3B:
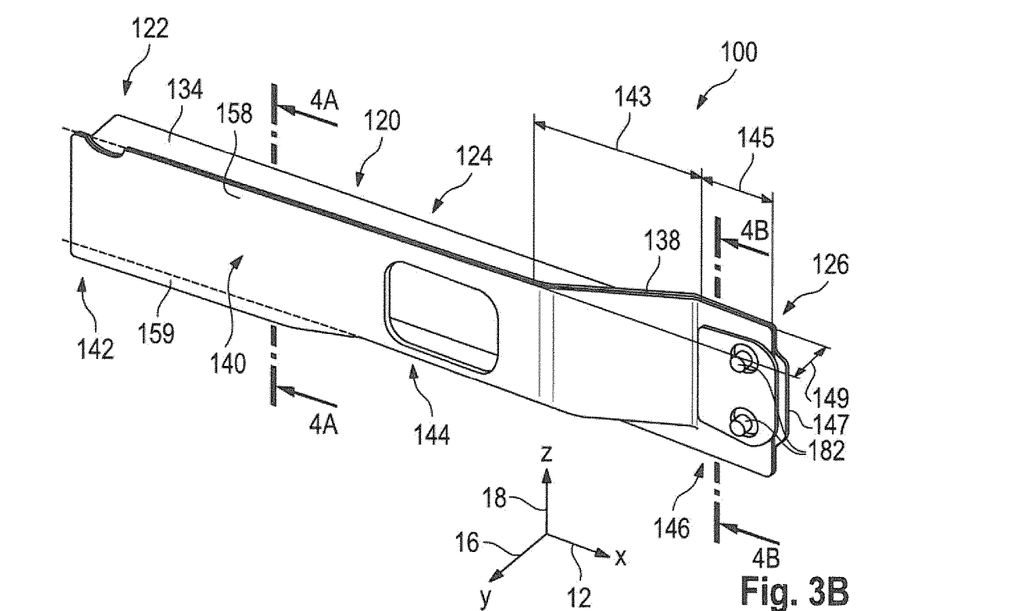
FIG. 3B is a perspective view of the engine support device from FIG. 3A, with a view from a direction different from that of FIG. 3A.

FIG. 3A illustrates an engine support device 100 according to the invention with a view of a first half-shell (exterior shell) 120, which is on the outside when installed in a motor vehicle, while FIG. 3B is a view of a second half-shell (interior shell) 140, which is on the inside when installed in a motor vehicle.

The engine support device 100 according to the invention comprises a first half-shell (exterior shell) 120, which has a first (rearward) end section 122, a second (forward) end section 126, which is opposite the first (rearward) end section 122, a first middle section 124 which is arranged between the first and the second end sections 122 and 126, a first side cheek section 128 and an upper horizontal section 134. The engine support device 100 further comprises a second half shell (interior shell) 140, which has a third (rearward) end section 142, a fourth (forward) end section 146 opposite the third (rearward) end section 142, a second middle section 144 arranged between the third and the fourth end section 142 and 146, a second side cheek section 148 and a lower horizontal section 156.

The first half-shell 120 and the second half-shell 140 are each designed for extending essentially in a longitudinal direction 12 of a motor vehicle in a condition in which the device 100 is installed in a motor vehicle. In this case, the first half-shell 120 is designed for being arranged on an exterior side of the device 100, while the second half-shell 140 is designed for being arranged on an interior side of the device 100. In other words, the first half-shell 120 is provided as an interior shell, and the second half-shell 140 is provided as an exterior shell. In this case, the second end section 126 of the first half-shell 120 is arranged in front of its first end section 122. In other words, the first end section 122 of the first half-shell (exterior shell) 120 is provided as its rearward end section and the second end section 126 is provided as its forward end section. From its first end section 122 to its second end section 126, the first side cheek section 128 continuously has essentially straight-line edges 130 and 132. The fourth end section 146 of the second half-shell 140 is arranged in front of the third end section 142. In other words, the third end section 142 of the second half-shell (interior shell) 140 is provided as its rearward end section and the fourth end section 146 is provided as its forward end section.

The second side cheek section 148 of the second half-shell 140 has continuously essentially straight-line edges 150 and 152 from its third end section 142 to its middle section 144. Between its middle section 144 and its fourth end section 146, the second side cheek section 148 has a first offset 149 in the direction of the first side cheek section 128, according to the invention. Between the second middle section 144 and the fourth end section 146, specifically in a first longitudinal section 143, which contains the first offset 149, the edges (upper edge 150 and lower edge 152) of the second side cheek section 148 approach the essentially straight-line edges (upper edge 130 and lower edge 132) of the first side cheek section 128 by a difference in distance which corresponds to the first offset 149. In the first longitudinal section 143, which contains the first offset 149, the second side cheek section 148, as a whole, also approaches the first side cheek section 128 by a difference in distance which corresponds to the first offset 149. In a second longitudinal section 145, which extends between the first longitudinal section 143 and a forward end 147 of the second side cheek section 148 (i.e. in front of the first longitudinal section 143), the edges 150 and 152 of the second side cheek section 148 touch the essentially straight-line edges 130 and 132 of the first side cheek section 128 and rest against the edges 130 and 132. In the second longitudinal section 145, the second side check section 148, as a whole, touches the first side cheek section 128. In other words, in the second (forward) longitudinal section 145, the second side cheek section 148 rests against the first side cheek section 128, and, because the side cheek sections 128 and 148 have an essentially planar (plane) design, the second side cheek section 148 rests flatly against the first side cheek section 128, as illustrated in FIGS. 3A, 3B, 4B and 5B.

Figure 6:
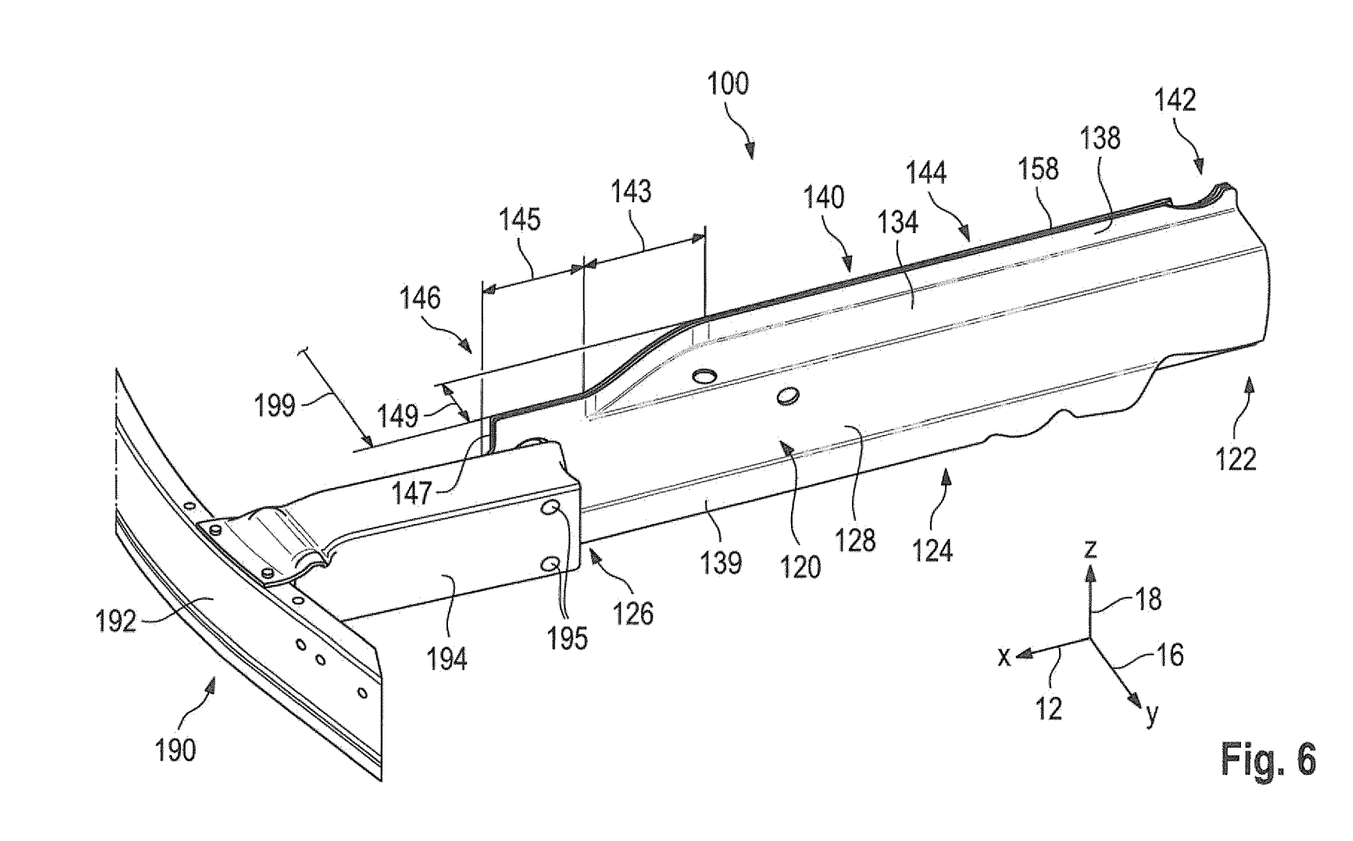
FIG. 6 is a perspective view of the engine support device from FIG. 3A with a bumper arrangement mounted thereon.

Through-holes are, in each case, provided in the second end section 126 and in the fourth end section 146, i.e. in the end sections 126 and 146 that are in the front in a condition in which the device is installed in a motor vehicle. In FIG. 3A, the through-holes 129 are shown in the second end section 126 of the first half-shell 120. Each through-hole is used for the pushing-through of a screw 182, by means of which the forward end sections 126 and 146 of the device 100 can be connected with a longitudinal support 194 of a bumper arrangement 190, as indicated in FIG. 6.

Figure 4A:
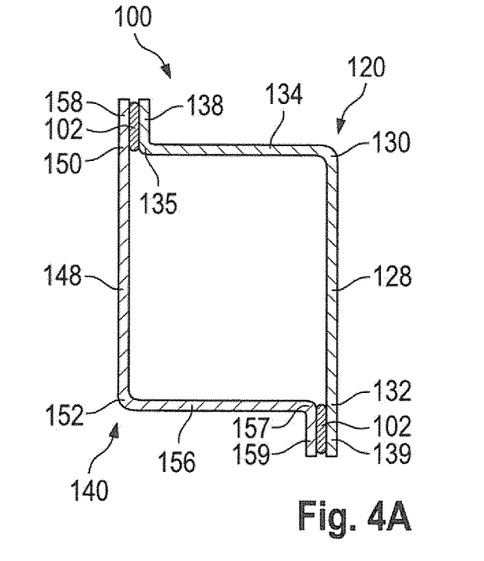
FIG. 4A is a view of a schematic cross-section of the engine support device from FIG. 3A, cut in the plane 4A-4A from FIG. 3A.
Figure 4B:
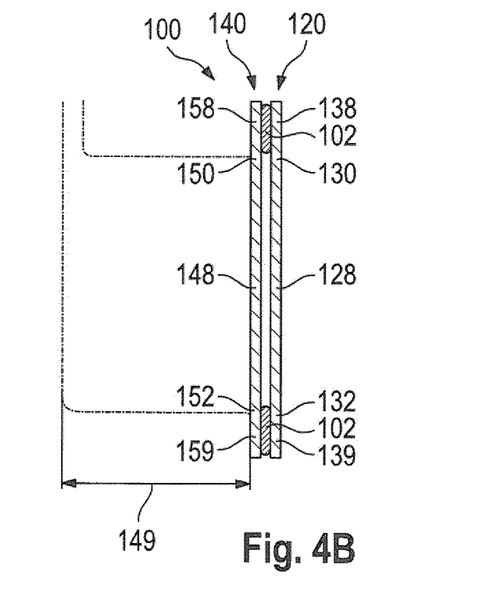
FIG. 4B is a view of a schematic cross-section, cut in the plane 4B-4B from FIG. 3A.

FIG. 4A is a schematic cross-sectional view of the engine support device 100 in the embodiment from FIGS. 3A and 3B, cut in the plane 4A-4A shown in FIGS. 3A and 3B. FIG. 4B is a schematic cross-sectional view of the engine support device 100 in the embodiment from FIGS. 3A and 3*b*, cut in the plane 4B-4*b* shown in FIGS. 3A and 3B.

In the embodiment illustrated in FIGS. 4A and 4B, the first half-shell 120 comprises a horizontal section 134, which is at the top in a condition in which the device 100 is installed in a motor vehicle, which upper horizontal section 134 is arranged on a top side and essentially horizontally, and a first top side edge flange 138 extending from an interior edge 135 of the upper horizontal section 134 essentially vertically upward. The second half-shell 140 comprises a second top side edge flange 158 which, in a condition in which the device 100 is installed, is arranged on a top side and extends essentially vertically upward. The second top side edge flange 158 rests against the first top side edge flange 138 and is connected with latter, for example, by means of spot welding or another connection technique.

In the embodiment illustrated in FIGS. 4A and 4B, the first half-shell 120 further comprises a first bottom side edge flange 139 which, in a condition in which the device 100 is installed in a motor vehicle, is arranged on a bottom side and extends essentially vertically downward. In a condition in which the device 100 is installed, the second half-shell 140 comprises a lower horizontal section 156, which is arranged on a bottom side and is arranged essentially horizontally, and a second bottom side edge flange 159 which extends essentially vertically downward from an exterior edge 157 of the lower horizontal section 156. The second bottom side edge flange 159 rests against the first bottom side edge flange 139 and is connected with the latter, for example, by means of spot welding or another connection technique.

In FIG. 4B, in which the engine support device 100 is cut in the area of the forward end sections 126 and 146 of the first and second half-shell 120 and 140, the second side cheek section 148 of the second half-shell 140 is arranged by the first offset 149 in a manner that is offset in the direction of the first side cheek section 128 of the first half-shell 120, and rests against the first side cheek section 128.

In a representation, which is analogous to the representation selected in FIGS. 4A and 4B, FIGS. 5A and 5B illustrate an alternative embodiment of an engine support device 100. In the embodiment illustrated in FIGS. 5A and 5B, the second half-shell 140 comprises a horizontal section 154 that is at the top in a condition in which the device 100 is installed in a motor vehicle, which upper horizontal section 154 is arranged on a top side and is essentially arranged horizontally, and a second top side edge flange 158 which extends from an exterior edge 155 of the upper horizontal section 154 essentially vertically upward. In a condition in which the device 100 installed, the first half-shell 120 comprises a first top side edge flange 138 arranged on a top side and extending essentially vertically upward. The second top side edge flange 158 rests against the first top side edge flange 138 and is connected with the latter, for example, by means of spot welding or another connection technique.

Figure 5A:
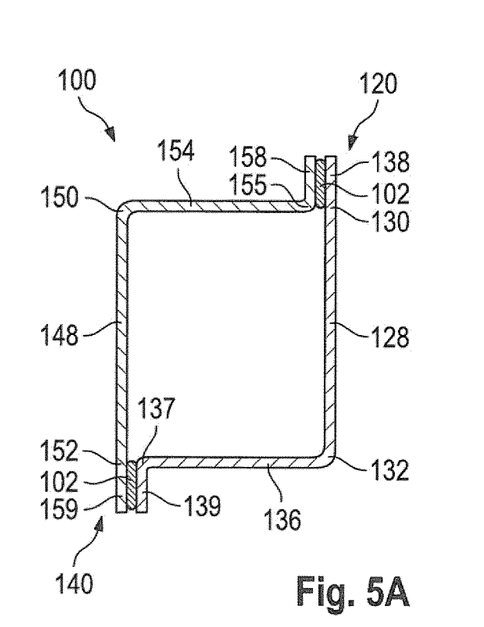
FIG. 5A is a view of a schematic cross-section of an engine support device according to an alternative embodiment illustrated in FIGS. 4A and 4B in a representation corresponding to FIG. 4A.
Figure 5B:
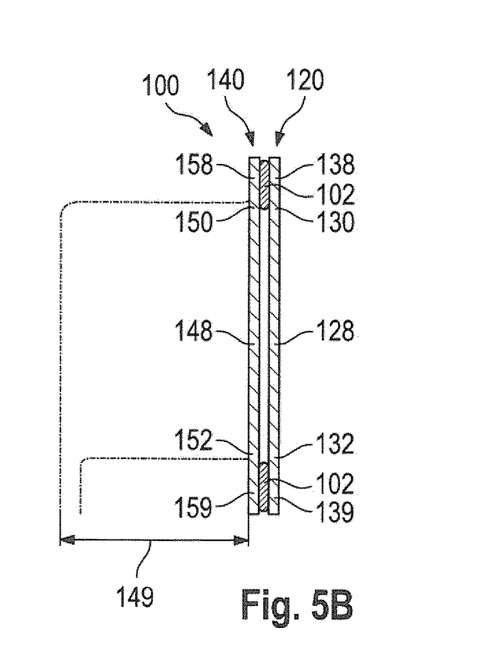
FIG. 5B is a view of a schematic cross-section of the engine support device from FIG. 5A in a representation corresponding to FIG. 4B.

In the embodiment illustrated in FIGS. 5A and 5B, the second half-shell 140 further comprises a second bottom side edge flange 159, which in a condition in which the device 100 is installed in a motor vehicle, is arranged on a bottom side and extends essentially vertically downward. The first half-shell 120 comprises a horizontal section 136 which is at the bottom when the device 100 is in the installed condition, which horizontal section 136 is arranged essentially horizontally on a bottom side, and a first bottom side edge flange 138 which extends essentially vertically downward from an interior edge 137 of the bottom horizontal section 136. The second bottom side edge flange 158 rests against the first bottom side edge flange 138 and is connected with the latter, for example, by means of spot welding or another connection technique.

In FIG. 5B, in which the engine support device 100 is cut in the area of the forward end sections 126 and 146 of the first and second half-shell 120 and 140, the second side cheek section 148 of the second half-shell 120 and 140, the second side cheek section 148 of the second half-shell 140 is arranged by the first offset 149 in the direction of the first side cheek section 128 of the first half-shell 120 in an offset manner, rests against the first side cheek section 128 and is connected with the latter, for example, by means of spot welding or another connection technique.

In FIGS. 4A, 4B, 5A and 5B, connections are outlined between the flanges, which rest against one another, in the form of representations of welded-on material 102.

FIG. 6 illustrates the engine support device 100 from FIGS. 3A and 3B, wherein a longitudinal support 194 of a bumper arrangement 190 is mounted on an exterior side of the second (forward) end section 126 of the first half-shell 120 in a condition in which the device 100 is installed in the motor vehicle 100. In addition to the left longitudinal support 194 illustrated in FIG. 6, the bumper arrangement 190 further comprises a right longitudinal support (not shown) and a front bumper element 192, which is mounted to the exterior sides of the respective second (forward) end section 126 of the first half-shells 120 of the devices 100. As mentioned above, because of the first offset 149 of the respective second (interior) half shell 140 according to the invention, the space width 199 of the installation space between the forward end sections 146 of the left engine support device 100 and the right engine support device (not shown), as a whole, is widened by twice that of the first offset 149.

The embodiment shown in FIG. 6 indicates that through holes 195 are formed in a rearward end section of the longitudinal support 194, whose positions correspond to the positions of the through holes 129 (shown in FIG. 3A) in the end sections 126 and 146 of the two half-shells 120 and 140. For the fastening of the longitudinal support 194 (more precisely, of the rearward end section on the longitudinal support 194) to the exterior side of the second side cheek section 148, it is provided that one screw respectively (not shown in FIG. 6) is fitted through the through holes 129 and 195, which each have a corresponding position, and, at the fitted-through end of the screw, a screw nut (not show in FIG. 6) is screwed on and is tightened. FIG. 6 indicates to a person skilled in the art that, in the event of a crash acting upon the bumper arrangement in the rearward direction, the introduction of force from the longitudinal support 194 into the engine support device 100 would be conveyed only by way of these screws. In this case, it would have to be assumed that these screws cannot absorb the forces occurring during a crash, but would be cut off or broken in two parts.

Figure 7:
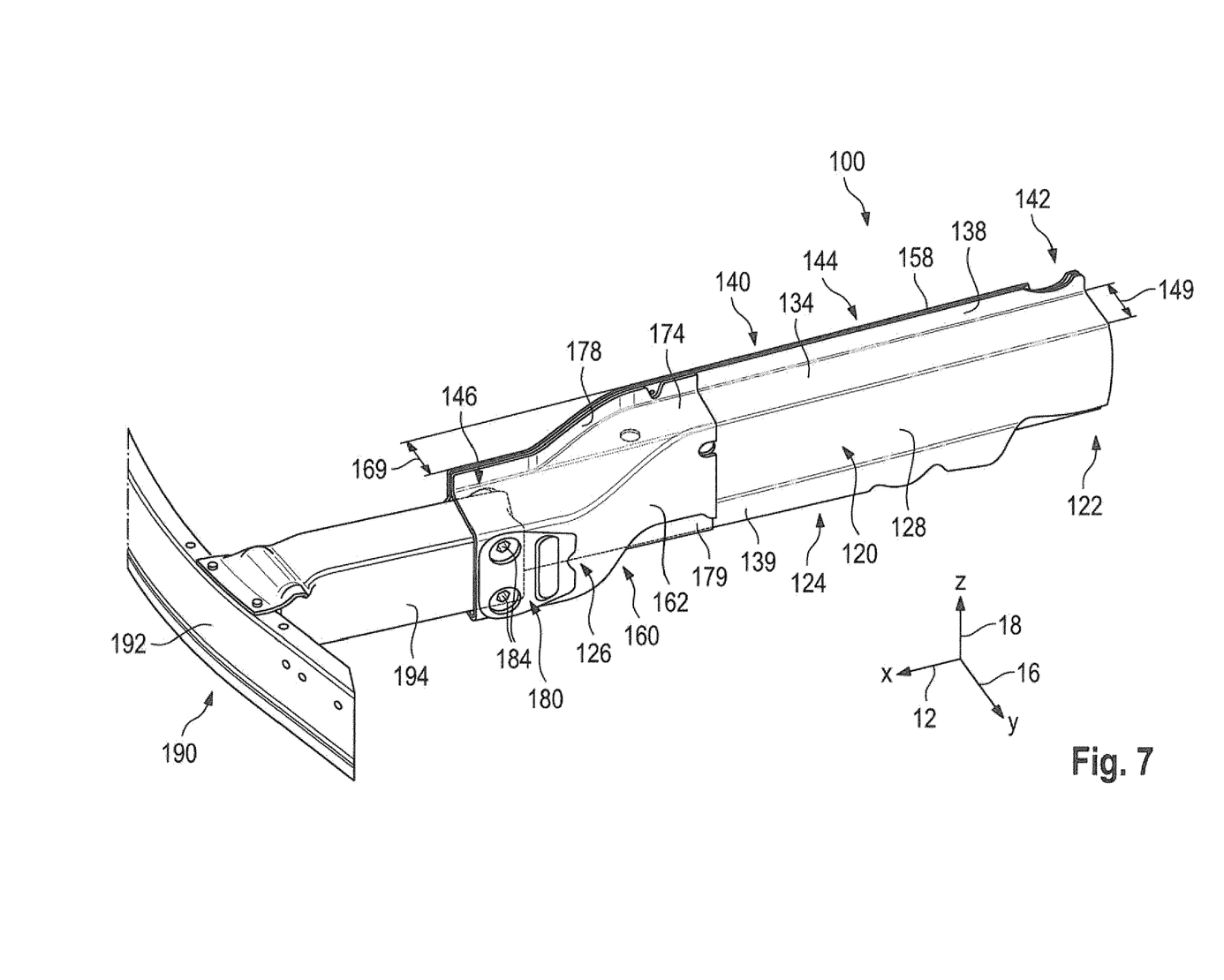
FIG. 7 is a perspective view of the assembly illustrated in FIG. 6 with a mounted-shell arrangement mounted thereon.

In order to reinforce the fastening of the longitudinal support 194 at the (forward) end section 146 of the engine support device 100 and in order to improve, in the event of a crash, the introduction of force from the longitudinal support 194 into the engine support device 100, according to the invention and, as shown in FIG. 7, a mounted-shell arrangement 160 is provided which can be placed upside-down from the exterior side onto the engine support device 100 and the section of the longitudinal support 194 overlapping in the longitudinal direction 12 of the vehicle with the engine support device 100.

Figure 8:
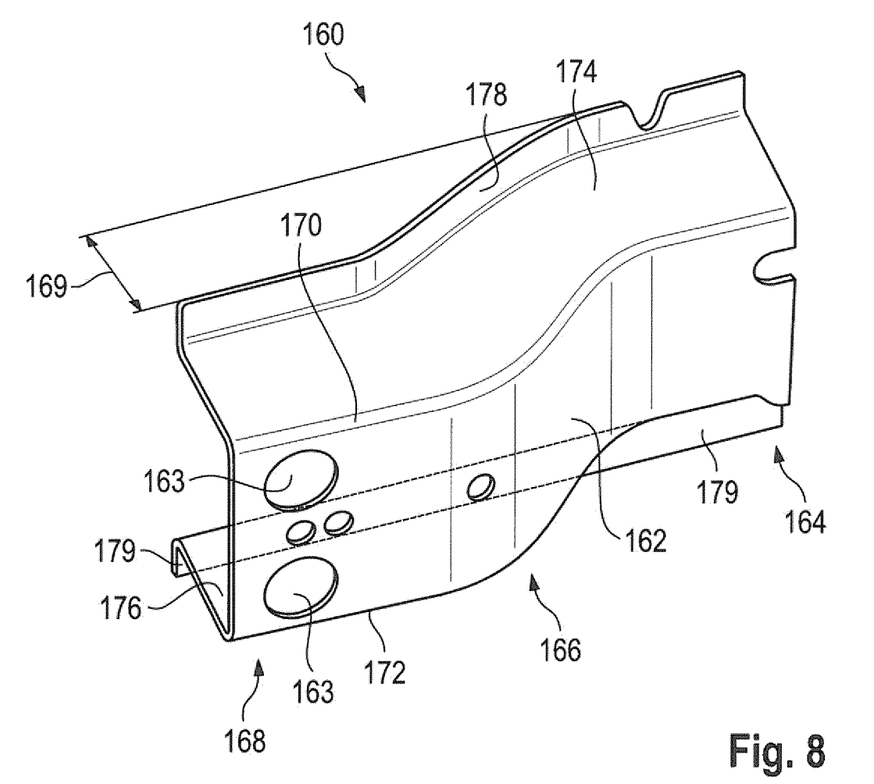
FIG. 8 is a perspective view of the mounted-shell arrangement from the assembly illustrated in FIG. 7.

FIG. 8 is perspective view of the mounted-shell arrangement 160 together with its details. The mounted-shell arrangement 160 comprises a shell cheek section 162 with a first (in FIG. 8, top) edge 170 and a second (in FIG. 8, bottom) edge 172, and further a first and a second shell plate section 174 and 176. The first shell plate section 174 extends from the first edge 170 and the second shell plate section 176 extends from the second edge 172 of the shell cheek section 162, specifically in each case in a direction essentially perpendicular to the shell cheek section 162. The mounted-shell arrangement 160 has a fifth end section 164 which, in the installed condition, is in the rear; a sixth end section 168 which is in the front, and a third middle section 166 arranged between the fifth and the sixth end section 164 and 168.

Analogously to the second side cheek section 148 of the second half-shell 140, the shell cheek section 162 according to the invention also forms an offset, specifically the second offset 169 illustrated in FIGS. 7 and 8. The second offset 169 is oriented in a direction perpendicular to the shell cheek section 162, and is formed in the third middle section 166 of the mounted-shell arrangement 160.

As illustrated in FIG. 7, in a condition installed in a motor vehicle, the mounted-shell arrangement 160 is arranged such that the shell cheek section 162 is essentially perpendicular, the first edge 170 is arranged above the second edge 172, and, in the transverse direction 16 of the motor vehicle, the second offset 169 is oriented in the direction of the exterior side of the motor vehicle. The second offset 169 of the shell cheek section 162 of the mounted-shell arrangement 160 has essentially the same size as the first offset 149 of the second side cheek section 148 of the second half-shell 140.

It is easily recognizable in FIG. 8 that the mounted-shell arrangement 160 has a third top side edge flange 178, which extends from an edge of the first shell plate section 174, which faces away from the shell cheek section 162, essentially vertically upward, and that it further has a third bottom side edge flange 179, which extends from an edge of the second shell plate section 176, which faces away from the shell cheek section 16, essentially vertically downward.

As illustrated in FIG. 7, for the connection with the engine support device 100, the third top side edge flange 178 of the mounted-shell arrangement 160 rests against the first top side edge flange 138 of the first half-shell 120 and is connected with the latter, for example, by means of spot welding or another connection technique. Furthermore, the third bottom side edge flange 179 rests against the first bottom side edge flange 139 and is connected with the latter, for example, by spot welding or another connection technique.

Because of the second offset 169 of the shell cheek section 162, an opening is formed in the area of the (forward) sixth end section 168 of the mounted-shell arrangement 160, between the shell cheek section 162 and the side cheek section 128 of the first half-shell 120, in which opening the rearward end section of a longitudinal support 194 of a bumper system 190 can be accommodated, as illustrated in FIG. 7.

For reinforcing the connection of the mounted-shell arrangement 160 with the longitudinal support 194 of the bumper system 190, an essentially plate-shaped reinforcing element 180 (shown in FIG. 7) is provided which, in a condition in which the device 100 is installed in a motor vehicle, is fastened to an exterior side of the shell cheek section 162 of the mounted-shell arrangement 160. The reinforcing element 189 has through holes 184 (shown in FIG. 7), whose positions correspond to the positions of the through holes (for example, 129 in FIG. 3A) in the end sections 126 and 146 of the half-shells 120 and 140. Furthermore, also in the sixth end section 168 of the mounted-shell arrangement 160, through holes 163 (shown in FIG. 8) are formed, whose positions correspond to the positions of the through holes in the end sections 126 and 146 of the half-shells 120 and 140 and the through holes 184 of the reinforcing element 180.

For fastening the longitudinal support 194 (more precisely, the rearward end section of the longitudinal support 194) in the opening formed between the shell cheek section 162 of the mounted-shell arrangement 160 and the side cheek section 128 of the first half-shell 120, it is provided that one screw respectively (not shown in FIG. 7) is fitted through the through holes 129, 195, 163 and 184 in their respectively corresponding position and, at the fitted-through end of the screw, a screw nut (not shown in FIG. 7) is screwed on and tightened.

LIST OF REFERENCE NUMBERS 10, 10' Engine support
11 Wheel cover mass
12 Longitudinal direction (x-direction)
14 Plane of symmetry
16 Transverse direction (y-direction)
18 Vertical direction (z-direction)
20, 20' First half-shell
22, 22' First end section
26, 26' Second end section
28, 28' First side cheek section
30, 30' Upper edge
32, 32' Lower edge
40, 40' Second half-shell
42, 42' Third end section
46, 46' Fourth end section
48, 48' Second side cheek section
50 Upper edge
52 Lower edge
80 Reinforcing element
82 Screw
90 Bumper arrangement
91 Barrier
92 Front bumper element
94 Longitudinal support
98 Overlapping
99 Space width
100 Engine support device
102 Welded-on material
120 First half-shell (exterior shell)
122 First end section (rearward end section)
124 First middle section
126 Second end section (forward end section)
128 First side cheek section
129 Through hole
130 Upper edge
132 Lower edge
134 Upper horizontal section
135 Interior edge
136 Lower horizontal section
137 Interior edge 138 First top side edge flange
139 First bottom side edge flange
140 Second half-shell (interior shell)
142 Third end section (rearward end section)
143 First longitudinal section
144 Second middle section
145 Second longitudinal section
146 Fourth end section (forward end section)
147 Forward end
148 Second side cheek section
149 First offset
150 Upper edge
152 Lower edge
154 Upper horizontal section
155 Exterior edge
156 Lower horizontal section
157 Exterior edge
158 Second top side edge flange
159 Second bottom side edge flange
160 Mounted-shell arrangement
162 Shell cheek section
163 Through hole
164 Fifth end section
166 Third middle section
168 Sixth end section
169 Second offset
170 First edge
172 Second edge
174 First shell plate section
176 Second shell plate section
178 Third top side edge flange
179 Third bottom side edge flange
180 Reinforcing element
182 Screw
184 Through hole
190 Bumper arrangement
192 Front bumper element
194 Longitudinal support
195 Through hole
198 Overlapping
199 Space width The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An engine support device for supporting an engine arranged in a front-end vehicle structure of a motor vehicle, the device comprising:
   a first half-shell, which has a first end section, a second end section opposite the first end section, and a first side cheek section, and is provided as an exterior shell in a condition installed in the motor vehicle, and
   a second half-shell, which has a third end section, a fourth end section opposite the third end section, a middle section arranged between the third and the fourth end section and a second side cheek section, and is provided as an interior shell in a condition installed in the motor vehicle, wherein
   the first and the second half-shells are designed for extending essentially in a longitudinal direction of the motor vehicle,
   the first side cheek section continuously has straight edges from the first end section to the second end section,
   the second side cheek section continuously has straight edges from the third end section to the middle section,
   the second side cheek section has a first offset between the middle section and the fourth end section in the direction of the first side cheek section, and, in a first longitudinal section which contains the first offset, approaches the first side cheek section by a difference in distance which corresponds to the first offset, and
   the second side cheek section rests against the first side cheek section at least in the fourth and second end sections respectively, in an essentially flat manner.

2. The engine support device according to claim 1, wherein
   for a condition in which the device is installed in the motor vehicle, the first half-shell is designed as an exterior side of the device,
   the second half-shell is designed as an interior side of the device, and
   the second end section is arranged in front of the first end section, and the fourth end section is arranged in front of the third end section.

3. The engine support device according to claim 2, wherein
   between the middle section and the fourth end section in a first longitudinal section, which contains the first offset, edges of the second side cheek section approach essentially straight-extending edges of the first side cheek section by the first offset.

4. The engine support device according to claim 3, wherein
   in a second longitudinal section, which extends between the first longitudinal section and an end of the second side cheek section closing off the fourth end section, the edges of the second side cheek section contact the first side cheek section.

5. The engine support device according to claim 1, wherein
   the first half-shell has a top horizontal section, which is arranged on a top side in a condition when the device is installed in the motor vehicle and is arranged essentially horizontally, and has a first top side edge flange extending essentially vertically upward from an interior edge of the top horizontal section,
   the second half-shell has a second top side edge flange which is arranged on a top side in the installed condition and extends essentially vertically upward, wherein the second top side edge flange rests against the first top side edge flange, and
   the first half-shell has a first bottom side edge flange, which, is arranged on a bottom side in a condition in which the device is installed in the motor vehicle, and extends essentially vertically downward,
   the second half-shell has a bottom horizontal section which is arranged on a bottom side in the installed condition and extends essentially horizontally, and has a second bottom side flange extending from an exterior edge of the bottom horizontal section essentially vertically downward, wherein the second bottom side edge flange rests against the first bottom side edge flange.

6. The engine support device according to claim 1, wherein
   the second half-shell has a top horizontal section, which is arranged on a top side in a condition when the device is installed in the motor vehicle and is arranged essentially horizontally, and has a second top side edge flange extending essentially vertically upward from an exterior edge of the top horizontal section, the first half-shell has a first top side edge flange which is arranged on a top side in the installed condition of the device and extends essentially vertically upward, wherein the second top side edge flange rests against the first top side edge flange, and the second half-shell has a second bottom side edge flange, which, is arranged on a bottom side in a condition in which the device is installed in a motor vehicle, and extends essentially vertically downward, the first half-shell has a bottom horizontal section which is arranged on a bottom side in the installed condition, and extends essentially horizontally, and has a first bottom side flange extending from an interior edge of the bottom horizontal section essentially vertically downward, wherein the second bottom side edge flange rests against the first bottom side edge flange.

7. The engine support device according to claim 1, further comprising:

a mounted-shell arrangement, which has a shell cheek section with a first and a second edge, as well as a first and a second shell plate section, wherein the first shell plate section extends from the first edge and the second shell plate section extends from the second edge, in each case, essentially perpendicular to the shell cheek section, and the shell cheek section has a second offset, which is oriented in a direction perpendicular to the shell cheek section.

8. The engine support device according to claim 7, wherein in a condition in which the mounted-shell arrangement is installed in the motor vehicle, the shell cheek section is arranged essentially vertically and the first edge is arranged above the second edge, and the second offset is oriented in a transverse direction of the motor vehicle in the direction of an exterior side.

9. The engine support device according to claim 5, further comprising:

a mounted-shell arrangement, which has a shell cheek section with a first and a second edge, as well as a first and a second shell plate section, wherein the first shell plate section extends from the first edge and the second shell plate section extends from the second edge, in each case, essentially perpendicular to the shell cheek section, and the shell cheek section has a second offset, which is oriented in a direction perpendicular to the shell cheek section.

10. The engine support device according to claim 9, wherein in a condition in which the mounted-shell arrangement is installed in the motor vehicle, the shell cheek section is arranged essentially vertically and the first edge is arranged above the second edge, and the second offset is oriented in a transverse direction of the motor vehicle in the direction of an exterior side.

11. The engine support device according to claim 6, further comprising:

a mounted-shell arrangement, which has a shell cheek section with a first and a second edge, as well as a first and a second shell plate section, wherein the first shell plate section extends from the first edge and the second shell plate section extends from the second edge, in each case, essentially perpendicular to the shell cheek section, and the shell cheek section has a second offset, which is oriented in a direction perpendicular to the shell cheek section.

12. The engine support device according to claim 11, wherein in a condition in which the mounted-shell arrangement is installed in the motor vehicle, the shell cheek section is arranged essentially vertically and the first edge is arranged above the second edge, and the second offset is oriented in a transverse direction of the motor vehicle in the direction of an exterior side.

13. The engine support device according to claim 7, wherein the second offset of the shell cheek section of the mounted-shell arrangement has essentially the same size as the first offset of the second side cheek section of the second half-shell.

14. The engine support device according to claim 8, wherein the second offset of the shell cheek section of the mounted-shell arrangement has essentially the same size as the first offset of the second side cheek section of the second half-shell.

15. The engine support device according to claim 7, wherein the mounted-shell arrangement has a third top side edge flange, which extends from an edge of the first shell plate section facing away from the shell cheek section, in a condition in which the mounted-shell arrangement is installed in the motor vehicle, essentially vertically upward, and a third bottom side edge flange which extends from an edge of the second shell plate section facing away from the shell cheek section, in the condition in which the mounted-shell arrangement is installed, essentially vertically downward, and the third top side edge flange rests against the first top side edge flange, and is connected with the latter, and the third bottom side edge flange rests against the first bottom side edge flange, and is connected with the latter.

16. A front-end vehicle structure of a motor vehicle designed for accommodating an engine, comprising first and second engine support devices according to claim 1, wherein the first engine support device is arranged in the vehicle on a left side of a plane of symmetry of the vehicle and extends in a longitudinal direction of the vehicle, and the second engine support device is arranged in the vehicle on a right side of the plane of symmetry of the vehicle and extends in the longitudinal direction.

17. The front-end vehicle structure according to claim 16, further comprising:

a bumper arrangement, which has a front bumper element, which extends in a transverse direction of the vehicle, a first longitudinal support, which extends from the front bumper element in a longitudinal direction of the vehicle toward the rear and is arranged on the left of the plane of symmetry of the vehicle, and a second longitudinal support, which extends from the front bumper element in the longitudinal direction of the vehicle toward the rear and is arranged on the right of the plane of symmetry of the vehicle, wherein the first longitudinal support is connected by way of the first mounted-shell arrangement assigned to the latter with the first engine support device, and the second longitudinal support is connected by way of the second mounted-shell arrangement assigned to the latter with the second engine support device.

* * * * *